US010289554B2

(12) United States Patent
Leslie-Hurd et al.

(10) Patent No.: US 10,289,554 B2
(45) Date of Patent: *May 14, 2019

(54) SUPPORTING FAULT INFORMATION DELIVERY

(71) Applicant: Intel Corporation, Santa Clara, CA (US)

(72) Inventors: Rebekah M. Leslie-Hurd, Portland, OR (US); Carlos V. Rozas, Portland, OR (US); Francis X. Mckeen, Portland, OR (US); Ilya Alexandrovich, Haifa (IL); Vedvyas Shanbhogue, Austin, TX (US); Bin Xing, Hillsboro, OR (US); Mark W. Shanahan, Raleigh, NC (US); Simon P. Johnson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,615

(22) Filed: Sep. 21, 2017

(65) Prior Publication Data
US 2018/0011793 A1    Jan. 11, 2018

Related U.S. Application Data

(63) Continuation of application No. 14/752,109, filed on Jun. 26, 2015, now Pat. No. 9,798,666.

(51) Int. Cl.
G06F 12/0844    (2016.01)
G06F 12/0882    (2016.01)
G06F 11/07      (2006.01)

(52) U.S. Cl.
CPC ........ *G06F 12/0844* (2013.01); *G06F 11/073* (2013.01); *G06F 11/0775* (2013.01); *G06F 12/0882* (2013.01); *G06F 2212/1032* (2013.01); *G06F 2212/1052* (2013.01); *G06F 2212/281* (2013.01); *G06F 2212/312* (2013.01); *G06F 2212/402* (2013.01); *G06F 2212/608* (2013.01)

(58) Field of Classification Search
CPC ........................ G06F 12/0844; G06F 12/0882
See application file for complete search history.

(56) References Cited

U.S. PATENT DOCUMENTS 9,798,666   B2 * 10/2017  Leslie-Hurd ........ G06F 12/0844
2012/0159184 A1 *  6/2012  Johnson ............. G06F 21/6218
                                                      713/189
2013/0326288 A1 * 12/2013  Datta .................. G06F 11/0754
                                                      714/48

* cited by examiner

Primary Examiner — Edward J Dudek, Jr.
(74) Attorney, Agent, or Firm — Lowenstein Sandler LLP

(57) ABSTRACT

A processor implementing techniques to supporting fault information delivery is disclosed. In one embodiment, the processor includes a memory controller unit to access an enclave page cache (EPC) and a processor core coupled to the memory controller unit. The processor core to detect a fault associated with accessing the EPC and generate an error code associated with the fault. The error code reflects an EPC-related fault cause. The processor core is further to encode the error code into a data structure associated with the processor core. The data structure is for monitoring a hardware state related to the processor core.

15 Claims, 12 Drawing Sheets

SUPPORTING FAULT INFORMATION DELIVERY

RELATED APPLICATIONS

This application is a continuation of U.S. patent application Ser. No. 14/752,109, filed Jun. 26, 2015, the entirety of which is incorporated herein by reference.

TECHNICAL FIELD

Embodiments of the disclosure relate generally to computer systems, and more specifically, but without limitation, to supporting fault information delivery.

BACKGROUND

Modern processors are designed to protect sensitive data in memory from both hardware and software attacks. Some processors provide strategies that can reserve a portion of memory and enforce cryptographic protections on this portion of memory. The portion of memory may include a plurality of secure memory pages that are accessible on a secure platform.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
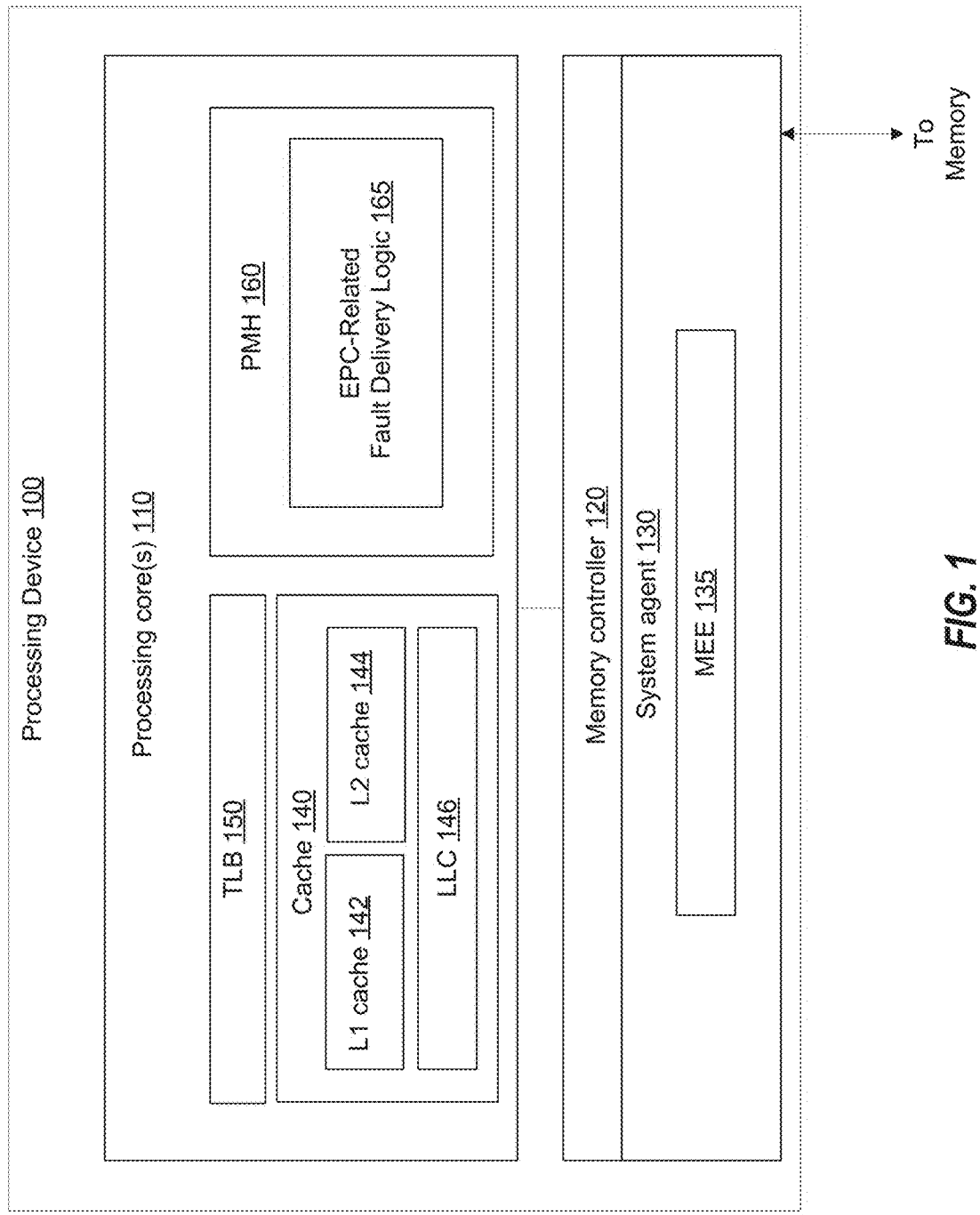
FIG. 1 illustrates a block diagram of a processing device according to one embodiment.

Techniques for supporting fault information delivery are described. In some embodiments, a processor is provided. In one embodiment, the processor may comprise processing logic configured to implement a trusted execution environment represented by a Secure Enclave (SE). "Secure enclave" herein shall refer to a protected area within an application's address space. Access to memory pages associated with the SEs from applications not resident in the SEs is prevented even if such access is attempted by a privileged application such as BIOS, operating systems or virtual machine monitors. An active secure enclave may be divided into an encrypted portion and a decrypted portion. The encrypted portion may reside in an unprotected memory (such as main memory or disk). The decrypted portion resides in an enclave page cache (EPC) associated with the SE. The EPC is a protected memory used by the processor to store SE memory pages.

In one embodiment, a page cache map, referred to herein as Enclave Page Cache Map (EPCM), may be employed to track the contents (e.g., memory pages) of the EPC. The EPCM may comprise a plurality of entries with each entry corresponding to a page in the EPC. Each EPCM entry may include, but not limited to, in an implementation-dependent format, the following information: whether the EPC page is valid or invalid; an identifier of the SE instance that owns the page; the type of the page (e.g., regular or secure); a virtual address through which the SE is allowed to access the page; read/write/execute permissions for the page; whether the page is accessible or not (BLOCKED or UNBLOCKED); etc.

The processor may implement several mechanisms for protecting access to the EPC. In one embodiment, the processor may implement a protection mechanism for the EPC using a memory encryption engine (MEE). The MEE uses cryptographic mechanisms to encrypt data and other techniques to provide integrity and confidentiality when memory pages of the EPC are stored in an untrusted external memory (e.g. DRAM). When EPC memory pages are read from DRAM, they are decrypted and integrity checked and then placed into an internal cache of the processor. At this point, an access control mechanism associated with the processor may take over. For example, the access control mechanism may be implemented using page miss handlers in processor cores of the processor. The page miss handlers are capable of performing a physical address lookup of memory pages of the EPC.

In some situations, a fault may be detected while executing instructions that access memory pages residing in the EPC. For example, the page miss handlers may raise a page fault associated with an attempt to access an EPC memory page. In such cases, it may be difficult for system software (e.g., operating system or virtual machine) to determine a cause of the fault, thus resulting in poor error handling. For example, current systems are not capable of delivering information regarding EPC related page faults to system software as each implementation of particular system software would need to be reengineered for such purposes. Furthermore, tracking the state of a memory page associated with the EPC (for example, by using the EPCM) creates significant overhead for the system software, thereby reducing system performance. In some embodiments, a failure to properly diagnose faults by the system software may cause unnecessary application crashes.

Embodiments of the present disclosure facilitate handling such faults by the system software. In one embodiment, error codes that represent EPC-related fault information may be encoded into a data structure associated with the processor, such as a page fault error code (PFEC). Typically, the PFEC is an error code delivered by the processor when a hardware page fault is detected. In some embodiments, error codes of the PFEC are extended to include an error code representing information associated with the EPC-related fault. This PFEC with the EPC fault information encoded therein may be then delivered to the system software so that the software can diagnosis a cause of the EPC-related fault and act accordingly. In another embodiment, instead of reusing the PFEC, a fault vector (e.g., page fault) may be created that indicates the presence of an EPC-related fault or a new processor instruction may be provided to read EPCM data so that the system software or application layer can diagnose the source of the EPC-related fault. Still further, other techniques may be used to provide an indication to system software from the processor hardware that an EPC-related memory access fault has occurred.

FIG. 1 illustrates a block diagram of a processing device 100, which may support fault information delivery according to one embodiment. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system.

The processor core(s) 110 may execute instructions of the processing device 100. The processor cores 110 include, but are not limited to, pre-fetch logic to fetch instructions, decode logic to decode the instructions, execution logic to execute instructions and the like. The processor core 110 may be used with a computing system on a single integrated circuit (IC) chip of a computing system. One embodiment of a computing system on a chip may comprise a processor and a memory. The memory for one such system is a flash memory. The flash memory can be located on the same die as the processor and other system components. Additionally, other logic blocks such as a memory controller or graphics controller can also be located on a system on a chip. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

Memory controller 120 may perform functions that enable the processing device 100 to access and communicate with main memory (not shown) that includes a volatile memory and/or a non-volatile memory. In one embodiment, the memory controller 120 may be coupled to a system agent 130 that may include, among other things, a memory encryption engine (MEE) 135. The MEE herein shall refer to a hardware-implemented processing logic that encrypts the traffic between the processing device 100 and platform memory, such as random access memory (SRAM) or dynamic random access memory (DRAM). In some embodiments, the MEE 135 may be located on a processor die associated with processing device 100, while the main memory is located off the processor die. The MEE 135 may intercept attempted memory accesses and generate an encryption key used to perform encryption, decryption of any cache line that gets evicted out of the processing device 100 if it belongs to an EPC.

The processing device 100 includes a cache unit 140 to cache instructions and/or data. The cache unit 140 includes, but is not limited to, a level one (L1) 142, level two (L2) 144, and a last level cache (LLC) 144, or any other configuration of the cache memory within the processing device 100. As shown, the cache unit 150 can be integrated into the processing cores 110. The cache unit 140 may store data (e.g., including instructions) that are utilized by one or more components of the processing device 100. For example, the cache unit 150 may locally cache data stored in a translation-lookaside buffer (TLB) 150 for faster access by the components of the processing device 100. In some embodiments, the L1 cache 142 and L2 cache 144 can transfer data to and from the LLC 146. In one embodiment, the memory controller 120 can be connected to the LLC 146. The memory controller 120 can assess EPC memory residing on memory storage with a physical address.

In certain implementations, processing device 100 may control access to memory pages of an EPC via the TLB 150 and a page miss handler (PMH) 160 as executed by the processor cores 110. The TLB 150 maintains a mapping of address translation between virtual addresses and corresponding physical addresses. For example, the processor device 100 may support virtual address spaces comprising memory locations of requested memory pages. The memory space locations may be referenced by instructions, including load and store instructions, using virtual addresses. The virtual addresses in turn get translated into physical addresses in memory. When a memory access request is received, such as for EPC memory, the PMH 160 performs a lookup on the TLB 150. The look up may determine whether the TLB 150 contains the physical address corresponding to the virtual address of the memory page. If the address translation is found, a TLB hit occurs. "TLB hit" refers to a situation when a requested virtual address is present in the TLB. "TLB miss" refers to the opposite situation: when the requested virtual address is not present in the TLB, the address translation may proceed by looking up the page table. After the physical address is determined, the virtual address to the physical address mapping in physical memory may be entered into the TLB 150.

If a TLB miss occurs, an extra lookup using the memory controller 120 may fetch an EPC memory page from an entry in the EPCM. In some situations, a page fault may occur as a result of accessing the EPC memory page. To facilitate handling of EPC-related faults, embodiments of the disclosure may extend the error codes in a PFEC associated with the processing device 100. The PFEC may be a data structure used by the processing device to indicate the occurrence of a hardware page fault. In one embodiment, the PMH 160 may utilize EPC-related fault delivery logic 165 to generate an error code related to the EPC page fault condition. The error code may be encoded into the PFEC and passed to system software (e.g., an operating system or virtual machine) for diagnosis. Embodiments described herein may be implemented as a set of instructions in the EPC-related fault delivery logic 165. In some embodiments, the processor cores 110 of the processing device 100 may execute the instructions in the EPC-related fault delivery logic 165 to generate the error code to encode in the PFEC. The instructions as executed by the processing core(s) 110 and the memory 201 as described above can be used with, for example, a system on a chip.

Figure 2:
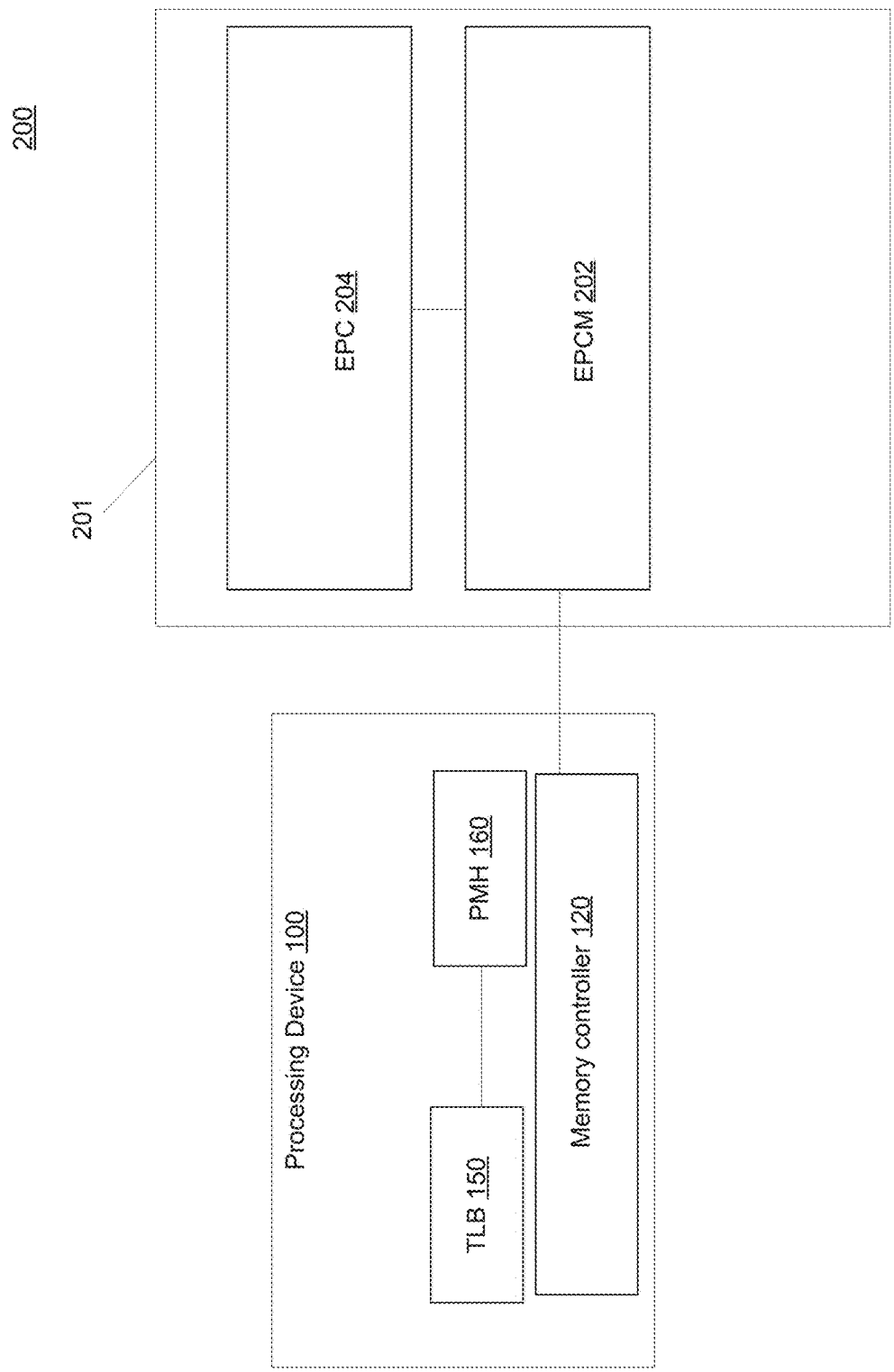
FIG. 2 illustrates a system including a memory for supporting fault information delivery according to one embodiment.

FIG. 2 illustrates a system 200 including a memory 201 for supporting fault information delivery according to one embodiment. In this example, the system 200 includes processing device 100 of FIG. 1. Each entry of TLB 150 of the processing device 100 may include one or more bits identifying the SE owning a memory location in memory 201 referenced by the entry. As noted above, if a TLB miss of an EPC memory pages occurs, an extra lookup of the EPCM 202 may be performed. For example, the memory controller 120 may fetch data from an entry in EPCM 202. The entry in the EPCM 202 is associated with a requested memory page in EPC 204. In some situations, a fault may occur as a result of the look up of the EPCM 204. For example, the fault may occur if access to the memory page of EPC 204 is performed in a manner that violates access permissions for the page in the EPCM 202 or other type of fault conditions. As discussed above, embodiments of the present disclosure may extend the error codes in the PFEC associated with the processing device 100 to include information regarding the EPC-related fault. Encoding of such information in the PFEC is further discussed below with regards to FIG. 3.

Figure 3:
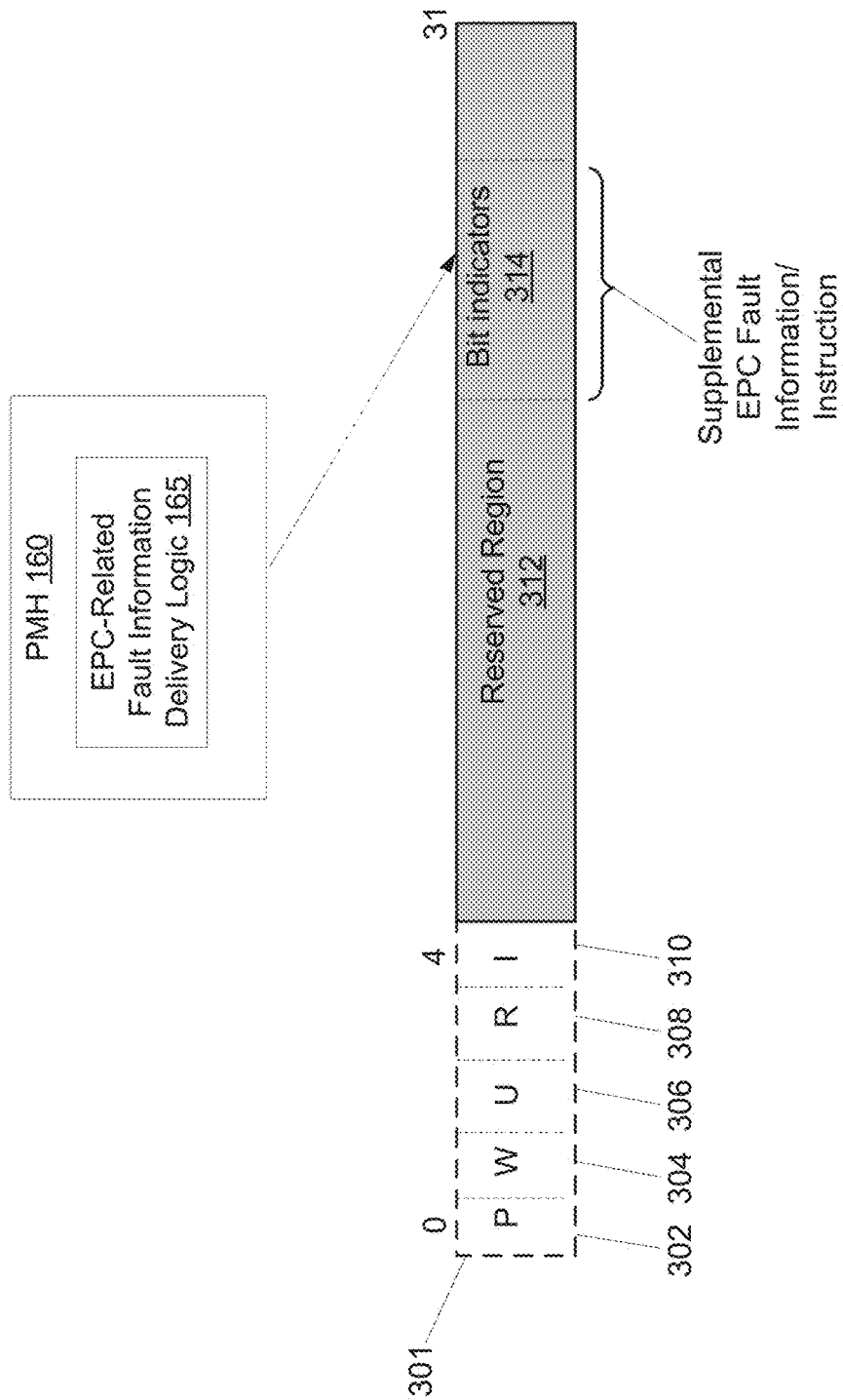
FIG. 3 illustrates a system including a data structure for supporting fault information delivery according to one embodiment.

FIG. 3 illustrates a system 300 including a data structure 301 for supporting fault information delivery according to one embodiment. In this example, the data structure 301 may include various values representing an error code associated with a page fault in system hardware (referred to herein as a page fault error code or PFEC). In other embodiments, the error codes may be associated with a fault vector or an instruction to read data from the EPCM regard an EPC-related fault condition.

In embodiments where the data structure 301 comprises the PFEC, error codes of the PFEC may include a number of values, with each value being indicative of an occurrence of a particular fault condition. In general, the PFEC may include five (5) bits 302-310 indicating particular error codes associated with a hardware page fault and a reserved region 312 that includes a number of bits. For example, the five bits 302-310 when set to a value provide error codes indicating what conditions caused the page fault. Specifically, bit-0 302 when set to a value indicates whether the page fault was caused by a non-present page in a page table used for address translation, such as when a virtual address is translated to a physical address in physical memory, bit-1 304 indicates whether the faulting access was a write, bit-2 306 indicates whether the access was originated when the processing device 100 was in user mode, bit-3 308 indicates whether the page fault was caused by a reserved-bit violation indicating that a reserved bit is set to an invalid value, and bit-4 310 indicates whether the page fault was caused by an instruction fetch.

In some embodiments, EPC-related fault information may be encoded in a region of data structure 301, such as the reserved region 312 of the PFEC. Conventionally, in the PFEC, bits in the reserved region 312 are not used, so they can be reserved for future extendibility of the PFEC. In one embodiment, the PMH 160 may utilize the EPC-related fault delivery logic 165 to generate an error code in response to receiving EPC-related fault information, such a page fault, related to accessing memory page associated with the EPC. To encode the EPC-related fault information into data structure 301, one or more bit indicators 314 may be set to a value. The bit indicators 314 that are set may represent a particular error code related to EPCM fault information. In one embodiment, the bit indicators 314 may include a determined number of bits in the reserved region 312 of the PFEC.

In one embodiment, the bit indicators 214 may include a particular bit indicating whether the fault information in data structure 301 is induced by access to a memory page of an EPC. If the bit is set, then the error code encoded in the reserved region 312 of the data structure 301 is EPC-related fault condition. If the fault condition is EPC-related, the PMH 160 may encode supplemental fault information in the data structure 301 by setting at least one of the bit indicators 314 in the reserved region 312 to a value. In some embodiments, the bit indicators 314 may include, but not limited to, a page-type mismatch bit indicating that an EPC page was accessed at an incorrect type, a RWX mismatch bit indicating that the EPC page access violated the EPC access permissions as set in the EPCM, and write-protected page bit indicating that the accessed EPC page is write protected.

Based on the supplemental fault information set in the bit indicators 214, the EPC-related fault condition can be identified and diagnosed. As an example, the processing device 100 may deliver data structure 301 to system software, such as an operating system or virtual machine. In some embodiment, processor cores of processing device 100 may send an alert to the system software that comprises information from the data structure 301. This alert may allow for application handling of the fault. For example, the system software may examine the bit indicators 214 that are set in the data structure 301 to determine a source of the fault condition an act accordingly to resolve the condition. Such resolutions may include reissuing an instruction that may have caused the fault condition if the condition appears to be spurious or allowing for a blocked or invalid EPC memory page to be remapped in situations where more flexible paging techniques are employed.

Figure 4:
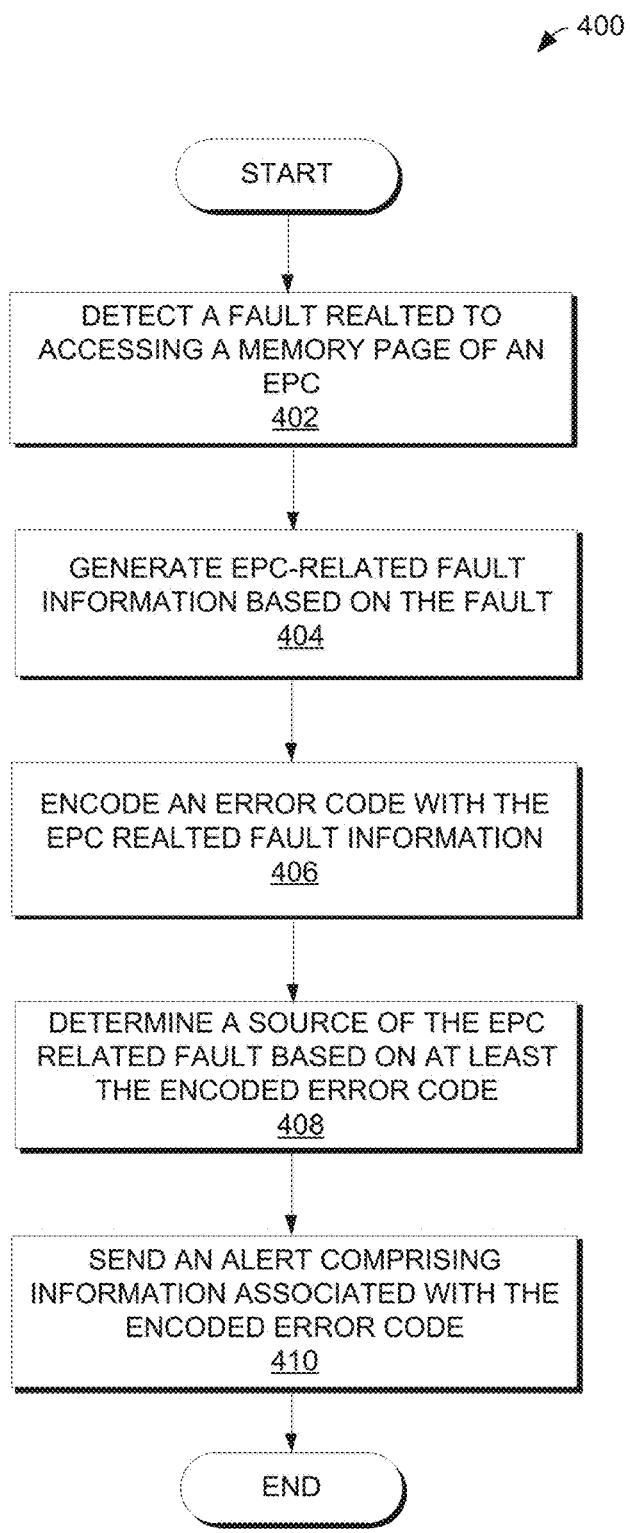
FIG. 4 illustrates a flow diagram of a method for supporting fault information delivery according to one embodiment.

FIG. 4 illustrates a flow diagram of a method 400 for supporting fault information delivery according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, processor cores 110 of processing device 100 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 400 begins at block 402 where a fault related to accessing a memory page of an EPC may be detected. For example, the processor cores 110 may detect a page fault regarding an access violation of an EPC memory page associated with the EPCM. At block 404, an EPC-related fault information may be generated based on the fault. As block 406, the EPC-related error code may be encoded with the fault information from block 4040. For example, and error code may be encoded into data structure 301, such as the PFEC, for monitoring a hardware state associated with the processor cores 110. In one embodiment, the EPC-related error code may be encoded into bits of a reserved region of the PFEC. In other embodiments, the error code may be associated with a fault vector (e.g., page fault) or a processor instruction to retrieve EPC-related fault information from the EPCM to encode into the data structure.

Based on the error code from block 406, a source of the EPC-related fault may be determined at block 408. For example, a source of the EPC-related fault condition may be determined based on the supplemental EPC fault information encoded in the error code from block 406 and a check of kernel data sources. The kernel data sources may refer to various formations (trees, lists, arrays, etc.) that define a source of information about the current state of processes running on a system. The kernel data sources keeps track of the state of the system—existing user processes, allocated memory, status of processors, loaded device drivers, status of hardware, cached I/O, network ports, timers, performance metrics, etc. In some embodiment, the EPC-related fault may be rooted in software associated with the processing device 100. For example, the fault may be related to a kernel (e.g., operating system) or a driver bug associated with the processing device. In some situations, this bug may cause the operating system to crash or malfunction, thus giving the appearance that accessing the EPC is the cause of page fault.

At block 410, an alert comprising the PFEC may be sent, for example, to an application associated with the EPC fault condition. This alert may include information regarding the source of the EPC-related fault. In some embodiment, the alert may also include information regarding a resolution to the EPCM induced fault condition. As an example, the alert indicating that application should retry an operation related to the EPC fault condition if the condition appears to be spurious or false. In some embodiments, other types of resolutions may be send in the alert depending upon the EPC related fault condition encoded in the error code and the determined source of the fault.

Figure 5:
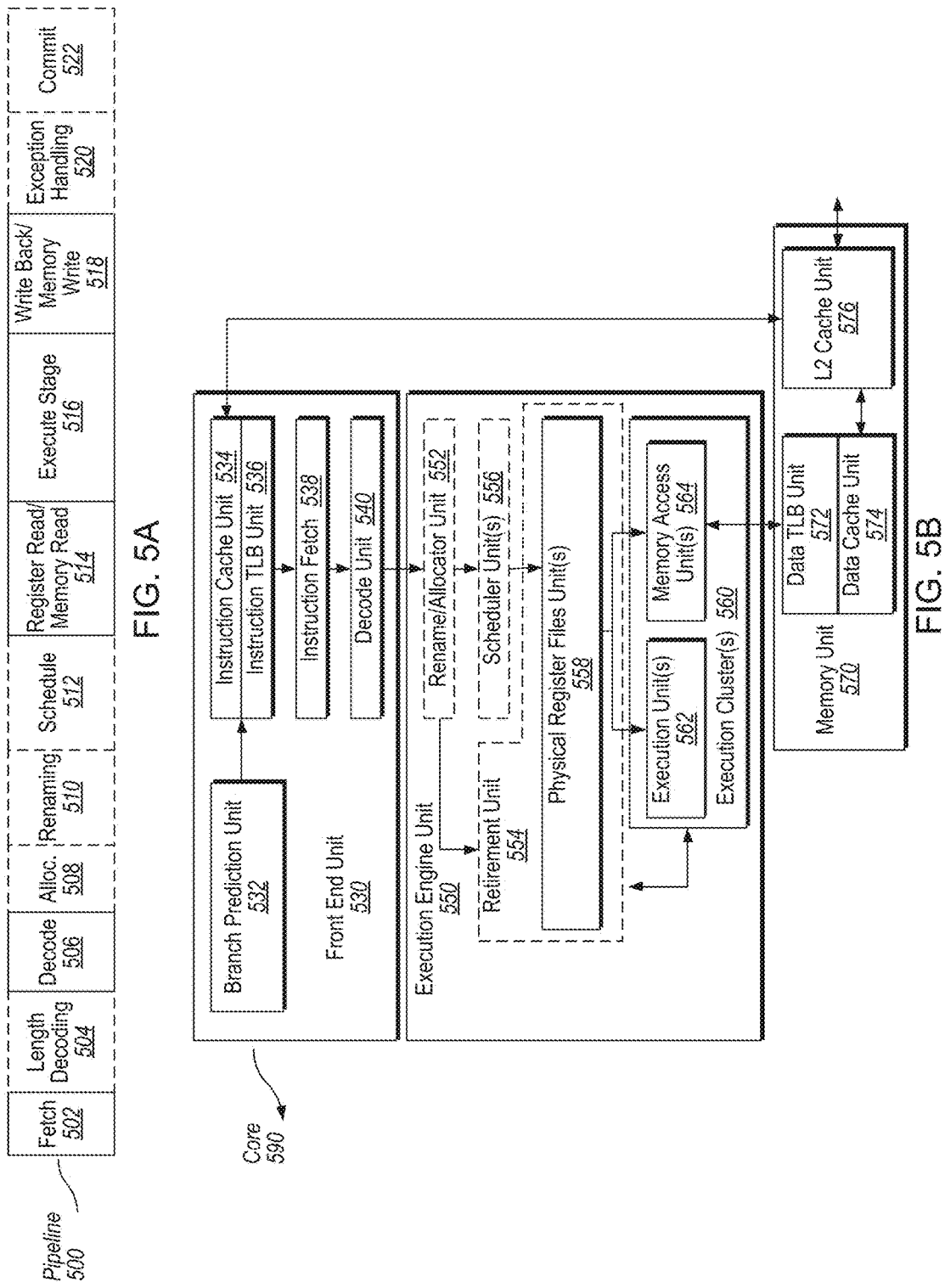
FIG. 5A is a block diagram illustrating a micro-architecture for a processor according to one embodiment.
FIG. 5B is a block diagram illustrating an in-order pipeline and a register renaming stage, out-of-order issue/execution pipeline according to one embodiment.

FIG. 5A is a block diagram illustrating a micro-architecture for a processor 500 that implements techniques for supporting fault information delivery in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 550 may include for example a power management unit (PMU) 590 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 500 may be the same as processing device 100 described with respect to FIG. 1. In particular, the data TLB unit 572 may be the same as TLB 155 and described with respect to FIG. 1, to implement techniques for supporting fault information delivery in a processing device described with respect to implementations of the disclosure.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
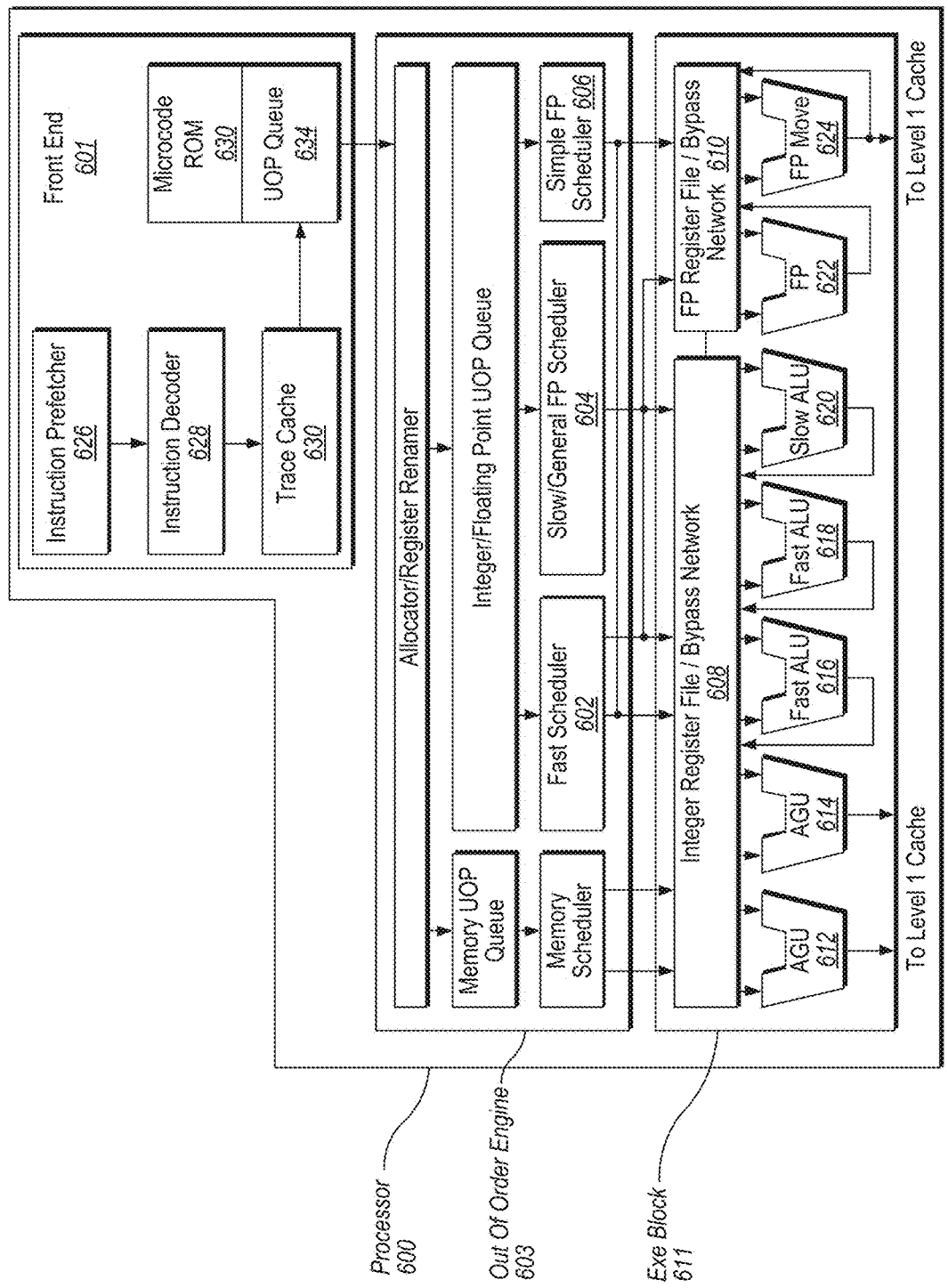
FIG. 6 is a block diagram illustrating a computer system according to one implementation.

FIG. 6 illustrates a block diagram of the micro-architecture for a processor 600 that includes logic circuits to implement techniques for supporting fault information delivery in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the disclosure, instructions involving a floating point value may be handled with the floating point hardware. In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing techniques for supporting fault information delivery.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
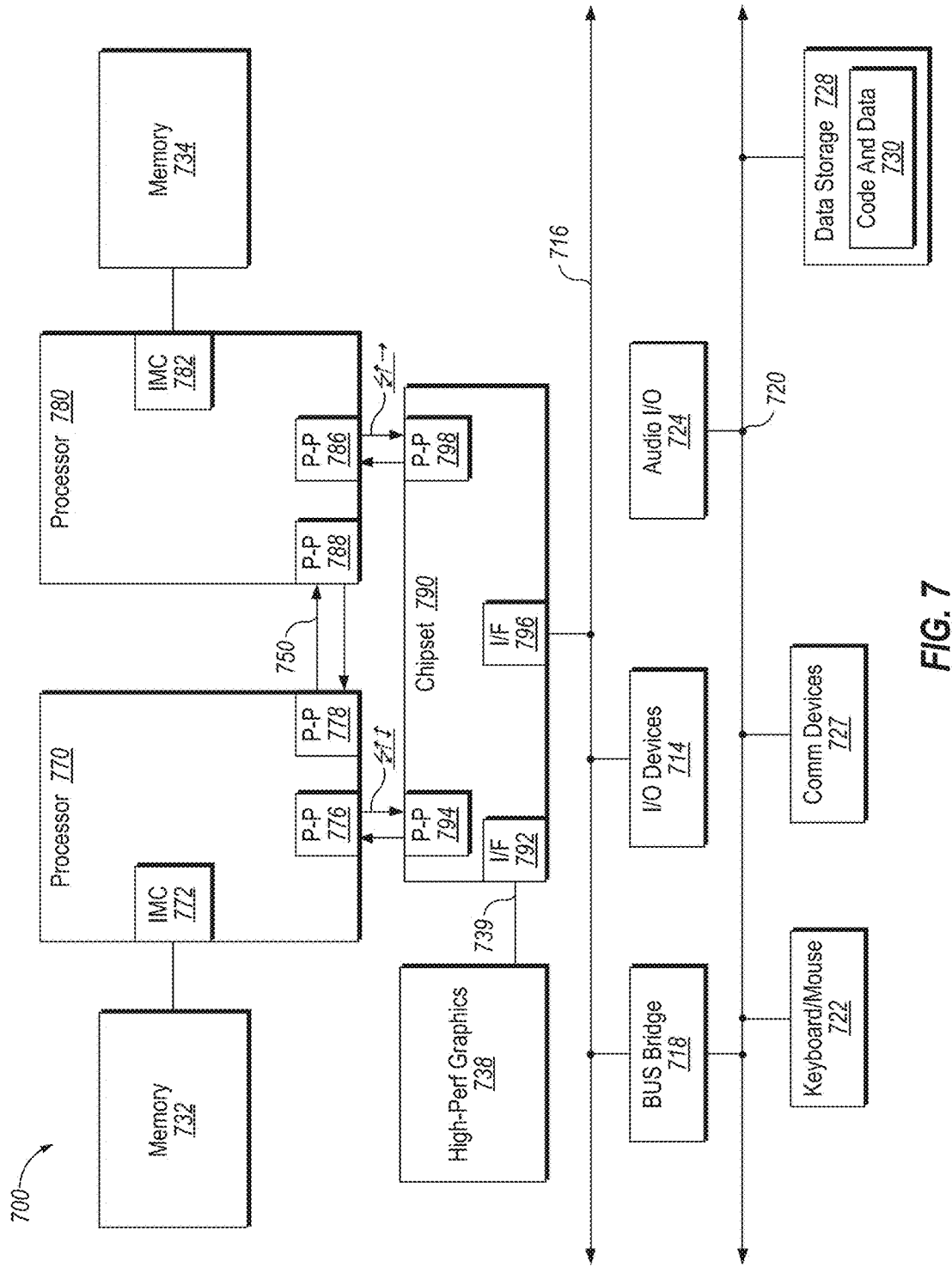
FIG. 7 is a block diagram illustrating a system in which an embodiment of the disclosure may be used.

Embodiments may be implemented in many different system types. Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement techniques for supporting fault information delivery as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
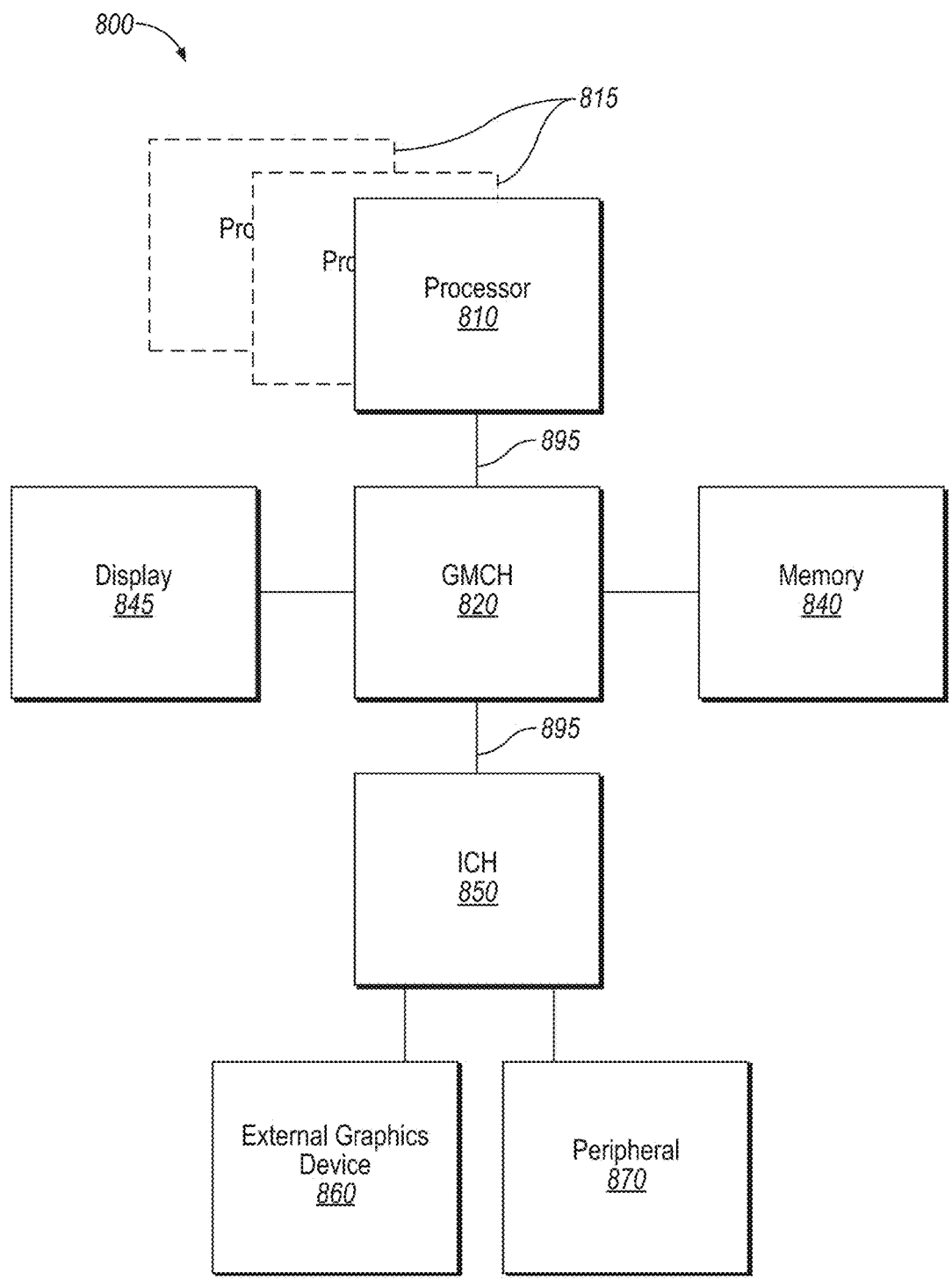
FIG. 8 is a block diagram illustrating a system in which an embodiment of the disclosure may be used.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement techniques for supporting fault information delivery according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
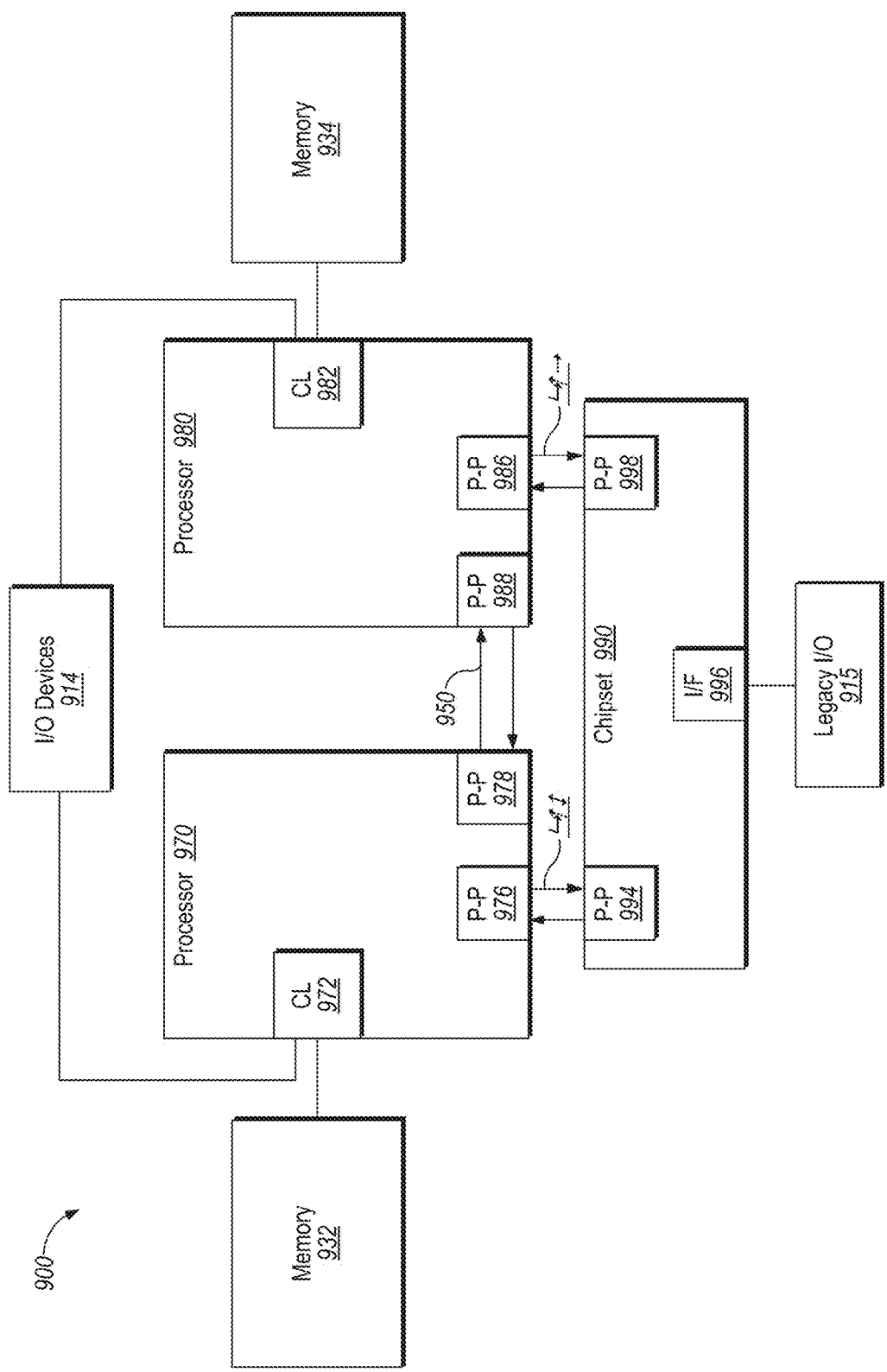
FIG. 9 is a block diagram illustrating a system in which an embodiment of the disclosure may be used.

Referring now to FIG. 9, shown is a block diagram of a system 900 in which an embodiment of the disclosure may operate. FIG. 9 illustrates processors 970, 980. In one embodiment, processors 970, 980 may implement techniques for supporting fault information delivery as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
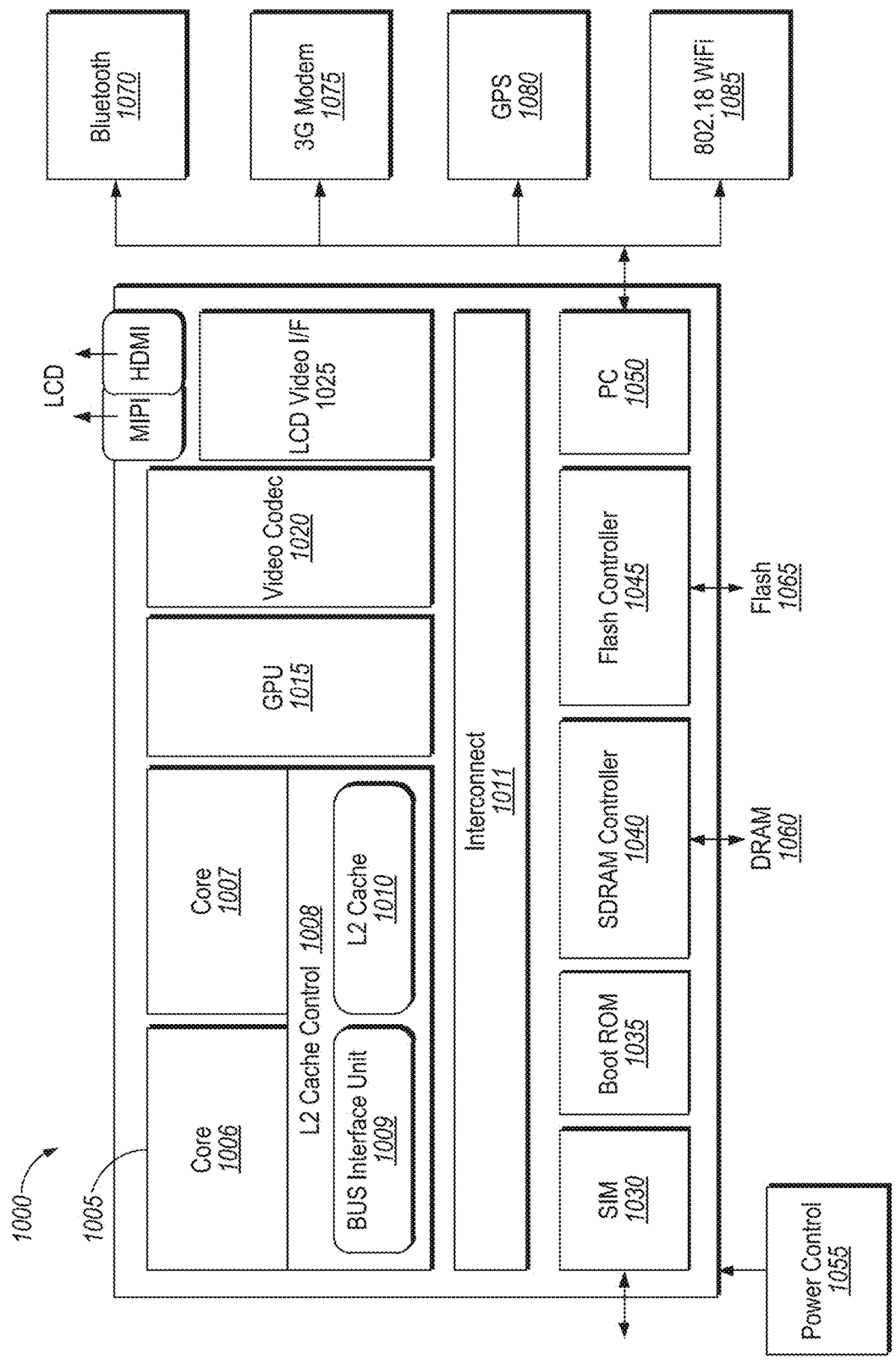
FIG. 10 is a block diagram illustrating a System-on-a-Chip (SoC) in which an embodiment of the disclosure may be used.

Embodiments may be implemented in many different system types. FIG. 10 is a block diagram of a SoC 1000 in accordance with an embodiment of the disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing silent memory instructions and miss-rate tracking to optimize switching policy on threads as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
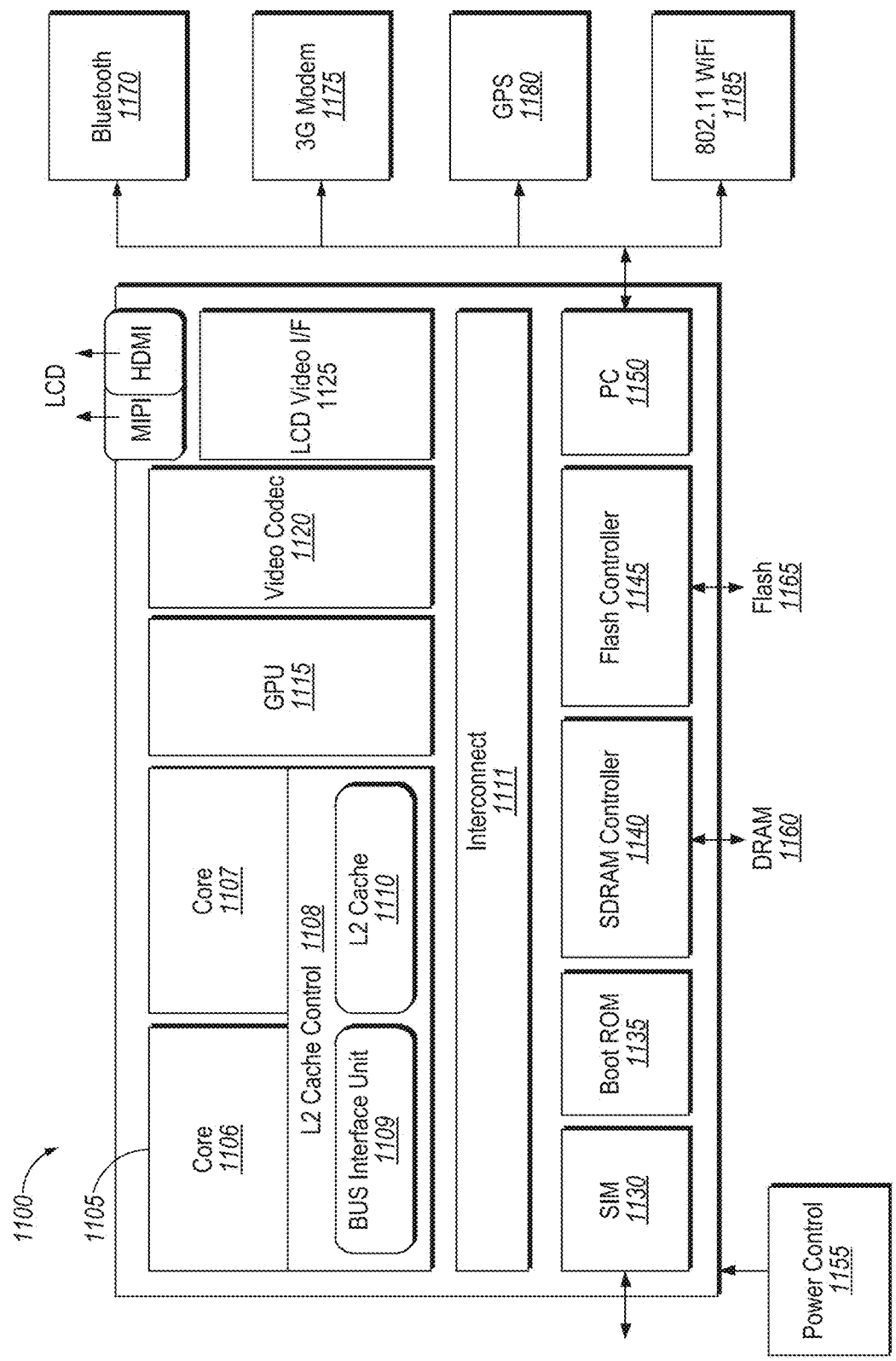
FIG. 11 is a block diagram illustrating a SoC design in which an embodiment of the disclosure may be used.

FIG. 11 is a block diagram of an embodiment of a system on-chip (SoC) design in accordance with the disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores-1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement techniques for supporting fault information delivery as described in embodiments herein.

Interconnect 1110 provides communication channels to the other components, such as a Subscriber Identity Module (SIM) 1130 to interface with a SIM card, a boot ROM 1140 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
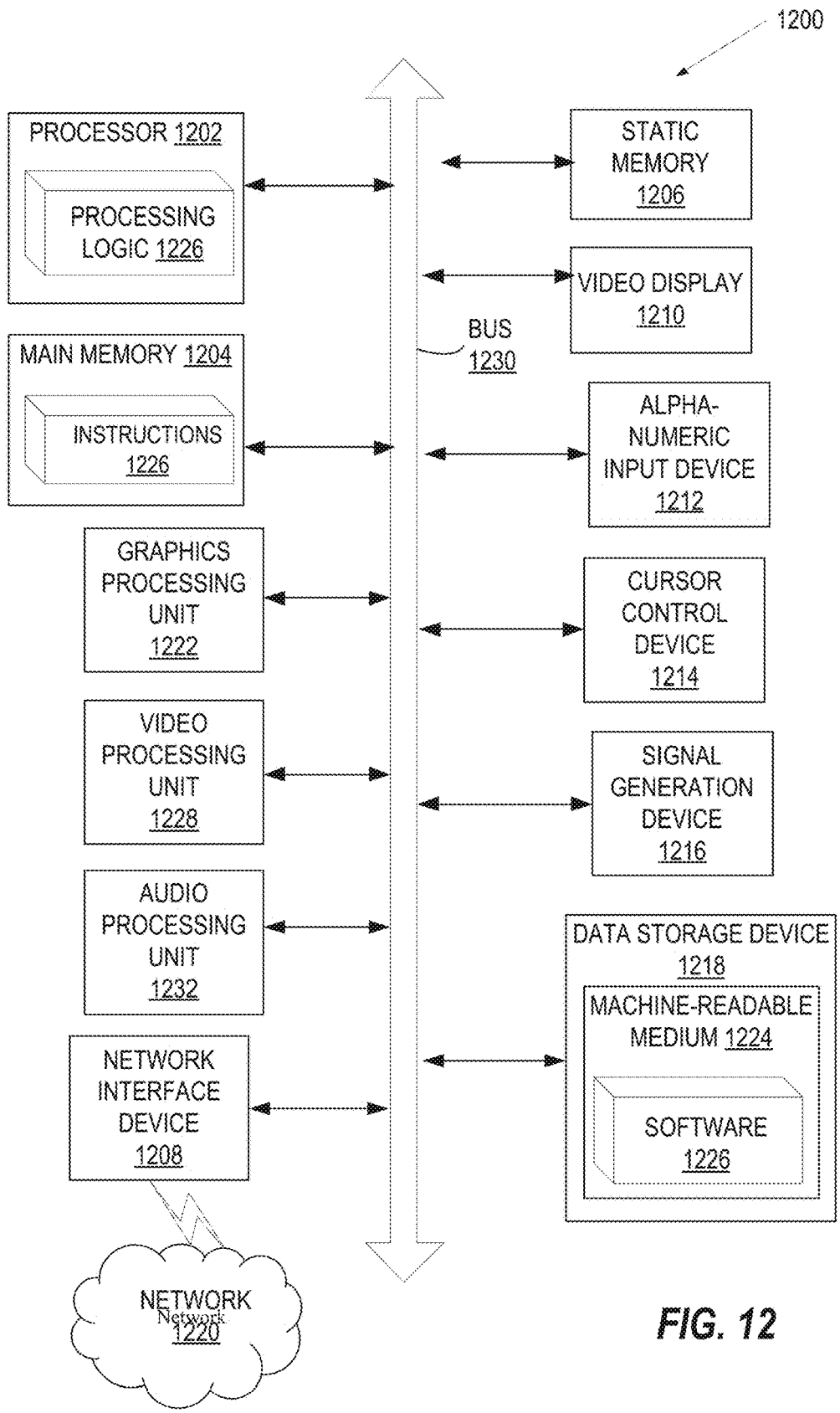
FIG. 12 illustrates a block diagram illustrating a computer system in which an embodiment of the disclosure may be used.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 that implements techniques for supporting fault information delivery as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing silent memory instructions and miss-rate tracking to optimize switching policy on threads in a processing device as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing silent memory instructions and miss-rate tracking to optimize switching policy on threads in a processing device such as described with respect to processing device 100 in FIG. 1, and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 is a processor comprising: a) a memory controller unit to access an enclave page cache (EPC); and b) a processor core coupled to the memory controller unit. The processor core to: 1) detect a fault associated with accessing the EPC; 2) generate an error code associated with the fault, wherein the error code reflects an EPC-related fault cause; and 3) encode the error code into a data structure associated with the processor core. The data structure for monitoring a hardware state related to the processor core.

In Example 2, the subject matter of Example 1, wherein the processor core is further to set an indicator in the data structure that indicates the fault is caused by access of a memory page of the EPC.

In Example 3, the subject matter of any one of Examples 1-2, wherein the processor core is further to set an indicator in the data structure that represents error code information associated with the EPC-related fault.

In Example 4, the subject matter of any one of Examples 1-3, the error code information comprises several bit indicators indicating at least one of a memory page of the EPC that is accessed at an incorrect type, that the memory page access violated the EPC access permissions, and that the memory page of the EPC is write protected.

In Example 5, the subject matter of any one of Examples 1-4, wherein the processor core further to send an alert comprising information from the data structure associated with the EPC-related fault cause.

In Example 6, the subject matter of any one of Examples 1-5, wherein the alert further comprises information of a resolution for the EPC-related fault cause.

In Example 7, the subject matter of any one of Examples 1-6, wherein the processor core is further to: 1) check a data source associated with a kernel executed by the processing cores; and determine the source of the EPC-related fault based on at least the data source associated with the kernel and the data structure associated with the EPC-related fault cause.

Various embodiments may have different combinations of the structural features described above. For instance, all optional features of the processor described above may also be implemented with respect to a method or process described herein and specifics in the examples may be used anywhere in one or more embodiments.

Example 8 is a method comprising 1) detecting, using a processing device, a fault associated with accessing an enclave page cache (EPC) in a memory device; 2) generating an error code associated with the fault, wherein the error code reflects an EPC-related fault cause; and 3) encoding the error code into a data structure associated with the processing device. The data structure for monitoring a hardware state related to the processing device.

In Example 9, the subject matter of Example 8, further comprising setting an indicator in the data structure that indicates the fault is caused by access of a memory page of the EPC.

In Example 10, the subject matter of any one of Example 8-9, further comprising setting an indicator in the data structure that represents error code information associated with the EPC-related fault.

In Example 11, the subject matter of any one of Example 8-10, wherein the error code information comprises several bit indicators indicating at least one of a memory page of the EPC that is accessed at an incorrect type, that the memory page access violated the EPC access permissions, and that the memory page of the EPC is write protected.

In Example 12, the subject matter of any one of Example 8-11, further comprising sending an alert comprising information from the data structure associated with the EPC-related fault cause.

In Example 13, the subject matter of any one of Example 8-12, wherein the alert further comprises information of a resolution for the EPC-related page cause.

In Example 14, the subject matter of any one of Example 8-13, further comprising: 1) checking a data source associated with a kernel executed by the processing device; and 2) determining the source of the EPC-related fault based on at least the data source associated with the kernel and the data structure associated with the EPC-related fault cause.

Various embodiments may have different combinations of the operational features described above. For instance, all optional features of the methods described above may also be implemented with respect to a non-transitory, computer-readable storage medium. Specifics in the examples may be used anywhere in one or more embodiments.

Example 15 is a non-transitory, computer-readable storage medium including instructions that when executed by a processor, cause the processor to: a) detect, using the processing system, a fault associated with accessing an EPC in memory; b) generate an error code associated with the fault, wherein the error code reflects an EPC-related fault cause; and c) encode the error code into a data structure associated with the processing system. The data structure for monitoring a hardware state related to the processing system.

In Example 16, the subject matter of any one of Examples 15, wherein executable instructions further cause the processing system to set a bit in a reserved region the PFEC that indicates the page fault is caused by access of a memory page of the EPC.

In Example 17, the subject matter of any one of Examples 15-16, wherein executable instructions further causes the processing system to set an indicator in the data structure that indicates the fault is caused by access of a memory page of the EPC.

In Example 18, the subject matter of any one of Examples 15-17, the error code information comprises several bit indicators indicating at least one of a memory page of the EPC that is accessed at an incorrect type, that the memory page access violated the EPC access permissions, and that the memory page of the EPC is write protected.

In Example 19, the subject matter of any one of Examples 15-18, wherein executable instructions further cause the processing system to send an alert comprising information from the data structure associated with the EPC-related fault cause.

In Example 20, the subject matter of any one of Examples 15-19, wherein the alert further comprises information of a resolution for the EPC-related fault cause.

In Example 21, the subject matter of any one of Examples 15-20, wherein executable instructions further cause the processing system to: a check a data source associated with a kernel executed by the processing system; and b) determine the source of the EPC-related fault based on at least the associated with the kernel and the data structure associated with the EPC-related fault cause.

Various embodiments may have different combinations of the structural features described above. For instance, all optional features of the processors and methods described above may also be implemented with respect to a system described herein and specifics in the examples may be used anywhere in one or more embodiments.

Example 22 is a system comprising 1) a memory storing memory pages of an enclave page cache (EPC); and 2) a processor coupled to the memory. The processor to: a) detect a fault associated with accessing the EPC; b) generate an error code associated with the fault, wherein the error code reflects an EPC-related fault cause; and c) encode the error code into a data structure associated with the processor. The data structure for monitoring a hardware state related to the processor.

In Example 23, the subject matter of Example 22, wherein the processor is further to set an indicator in the data structure that indicates the fault is caused by access of a memory page of the EPC.

In Example 24, the subject matter of any one of Examples 22-23, wherein the processor is further to set an indicator in the data structure that represents error code information associated with the EPC-related fault.

In Example 25, the subject matter of any one of Examples 22-24, wherein the error code information comprises several bit indicators indicating at least one of a memory page of the EPC that is accessed at an incorrect type, that the memory page access violated the EPC access permissions, and that the memory page of the EPC is write protected.

In Example 26, the subject matter of any one of Examples 22-25, wherein the processor further to send an alert comprising information from the data structure associated with the EPC-related fault cause.

In Example 27, the subject matter of any one of Examples 22-26, wherein the alert further comprises information of a resolution for the EPC-related fault cause.

In Example 28, the subject matter of any one of Examples 22-27, wherein the processor is further to: 1) check a data source associated with a kernel executed by the processor; and 2) determine the source of the EPC-related fault based on at least the data source associated with the kernel and the data structure associated with the EPC-related fault cause.

Various embodiments may have different combinations of the operational features described above.

Example 29 is a system comprising a system on chip (SoC) comprising a plurality of functional units and a memory controller unit (MCU) coupled to the plurality of functional units, wherein the MCU comprises a processor, wherein the processor is configured to perform the method of examples 8-14.

In Example 30, the subject matter of Example 29, wherein the SoC further comprises the subject matter of any of the examples 1-7 and 15-21.

Example 31 is an apparatus comprising: 1) a plurality of functional units of a processor; 2) means for detecting a fault associated with accessing an enclave page cache (EPC) in memory; 3) means for generating an error code associated with the fault, wherein the error code reflects an EPC-related fault cause; and 4) means for encoding the error code into a data structure associated with the processor. The data structure for monitoring a hardware state related to the processor.

In Example 32, the subject matter of Example 31, further comprising the subject matter of any of claims 1-7 and 8-14.

Example 33 is a system comprising: a memory device and a processor comprising a memory controller unit, wherein the processor is configured to perform the method of any of examples 8-14.

In Example 34, the subject matter of Example 33, further comprising the subject matter of any of examples 1-7 and 15-21.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a processor core; and
   a memory handler circuit, coupled to the processor core, to:
   identify an error code associated with an access of an enclave page cache (EPC), wherein the EPC comprises protected memory to store secure enclave pages associated with execution of an application;
   determine a source of a fault related to the access based on the error code;
   encode the error code into a data structure for monitoring a hardware state related to the processor;
   provide information from the data structure indicating the source of the fault; and
   transmit an alert to the application associated with the fault, wherein the alert comprises the information of the data structure and is to indicate that the application is to retry an operation related to the fault.

2. The processor of claim 1, wherein the error code reflects a cause of an EPC-related fault.

3. The processor of claim 2, wherein the information comprises a resolution of the cause of the EPC-related fault.

4. The processor of claim 1, wherein the information comprises several bit indicators indicating at least one of a memory page of the EPC that is accessed at an incorrect type, that the access violated EPC access permissions, or that the memory page of the EPC is write protected.

5. The processor of claim 1, wherein the memory handler circuit is further to:
   check a data source associated with a kernel executed by the processor; and
   determine the source of the fault based on at least the data source associated with the kernel and the information of the data structure.

6. A method, comprising:
   identifying, by a processor, an error code associated with an access of an enclave page cache (EPC), wherein the EPC comprises protected memory to store secure enclave pages associated with execution of an application;
   determining, by the processor, a source of a fault related to the access based on the error code;
   encoding, by the processor, the error code into a data structure for monitoring a hardware state related to the processor;
   providing, by the processor, information from the data structure indicating the source of the fault; and
   transmitting, by the processor, an alert to the application associated with the fault, wherein the alert comprises the information of the data structure and is to indicate that the application is to retry an operation related to the fault.

7. The method of claim 6, wherein the error code reflects a cause of an EPC-related fault.

8. The method of claim 7, wherein the information comprises a resolution of the cause of the EPC-related fault.

9. The method of claim 6, wherein the information comprises several bit indicators indicating at least one of a memory page of the EPC that is accessed at an incorrect type, that the access violated EPC access permissions, or that the memory page of the EPC is write protected.

10. The method of claim 6, further comprising:
    checking a data source associated with a kernel executed by the processor; and
    determining the source of the fault based on at least the data source associated with the kernel and the information of the data structure.

11. A system comprising:
    a memory to store an enclave page cache (EPC), wherein the EPC comprises protected memory to store secure enclave pages associated with execution of an application; and
    a processor coupled to the memory, the processor to:
    identify an error code associated with an access of the EPC;
    determine a source of a fault related to the access based on the error code;
    encode the error code into a data structure for monitoring a hardware state related to the processor;
    provide information from the data structure indicating the source of the fault; and
    transmit an alert to the application associated with the fault, wherein the alert comprises the information of the data structure and is to indicate that the application is to retry an operation related to the fault.

12. The system of claim 11, wherein the error code reflects a cause of an EPC-related fault.

13. The system of claim 12, wherein the information comprises a resolution of the cause of the EPC-related fault.

14. The system of claim 11, wherein the information comprises several bit indicators indicating at least one of a memory page of the EPC that is accessed at an incorrect type, that the access violated EPC access permissions, or that the memory page of the EPC is write protected.

15. The system of claim 11, wherein the processor is further to:
    check a data source associated with a kernel executed by the processor; and
    determine the source of the fault based on at least the data source associated with the kernel and the information of the data structure.

* * * * *